United States Patent
Goto et al.

(10) Patent No.: US 6,764,407 B2
(45) Date of Patent: Jul. 20, 2004

(54) CONSTANT VELOCITY JOINT

(75) Inventors: Tatsuhiro Goto, Iwata (JP); Taku Itagaki, Iwata (JP); Yukihiro Watanabe, Iwata (JP); Hisaaki Kura, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/252,843

(22) Filed: Sep. 24, 2002

(65) Prior Publication Data
US 2003/0073501 A1 Apr. 17, 2003

(30) Foreign Application Priority Data
Sep. 26, 2001 (JP) .......................... 2001-294035

(51) Int. Cl.[7] .............................. F16D 3/205
(52) U.S. Cl. ........................ 464/111; 464/905
(58) Field of Search ................. 464/111, 130, 464/905; 384/261, 564

(56) References Cited

U.S. PATENT DOCUMENTS 1,630,339 A * 5/1927 Ganster ...................... 384/564
6,077,166 A * 6/2000 Reynolds
6,435,972 B1 * 8/2002 Kita et al. .................. 464/111
6,478,682 B1 * 11/2002 Kura et al. ................. 464/111

FOREIGN PATENT DOCUMENTS

| FR | 2 732 735 | | 10/1996 | |
| GB | 2009887 A | * | 6/1979 | ................. 464/111 |
| GB | 2 226 102 A | | 6/1990 | |
| JP | 2001-193752 | | 7/2001 | |
| SU | 0397693 | * | 9/1973 | ................. 464/111 |

OTHER PUBLICATIONS

SAE Universal Joint and Driveshaft Design Manual, AE–7, The Society of Automotive Engineers, Inc., Warrendale, PA, p. 138, TJ1079.S62 1979.*

* cited by examiner

Primary Examiner—Greg Binda
(74) Attorney, Agent, or Firm—Arent Fox PLLC

(57) ABSTRACT

A constant velocity universal joint is disclosed which includes an outer joint member with three axial track grooves and a tripod member with three radially projecting trunnion journals, each of the trunnion journals carrying a roller assembly received in each of the track grooves, a projection being formed at an end of each trunnion for interference with the roller assembly.

5 Claims, 8 Drawing Sheets

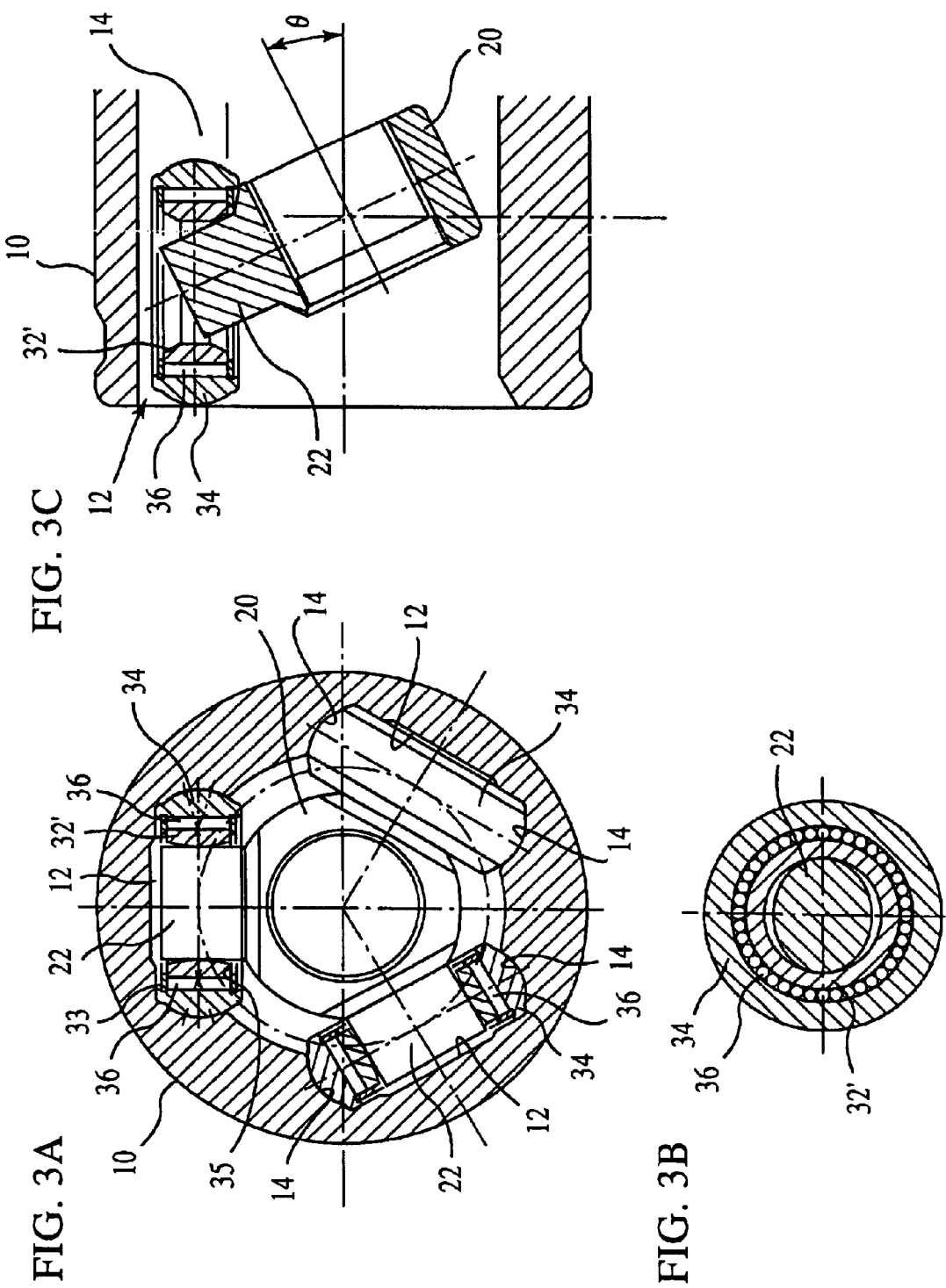

CONSTANT VELOCITY JOINT

BACKGROUND OF THE INVENTION

1. Field of the Invention

This invention relates to a constant velocity joint, specifically a plunging type tripod type constant velocity joint. Generally, the constant velocity joint is a kind of a universal joint capable of transmitting torque at constant velocity even if there is an angle between two shafts, on the driving and driven sides, when joined together. The plunging type is designed to allow relative axial displacement between two shafts by the plunging of the joint, while the tripod type uses a tripod member having three radially projecting trunnions and adapted to be joined to one shaft, and an outer joint member in the form of a hollow cylinder having three axially extending track grooves and joined to the other shaft, the trunnions of the tripod member being received in the track grooves of the outer joint member to effect torque transmission.

2. Brief Description of the Prior Art

The applicants have previously proposed a tripod type constant velocity joint designed for further reduction of induced thrust and slide resistance and for stability (Japanese Patent Laid-Open Publication 2000-320563). FIGS. 6 and 7 show a portion of such tripod type constant velocity joint. As can be seen from these figures, a functionally necessary clearance is defined between a roller assembly (32', 34) and the outer peripheral surface of a trunnion (22) (ag1<ΦDs1). In the assembly step, as soon as the roller assembly (32', 34) is set on the trunnion 22, the outer joint member (10: see FIG. 1A) is fitted. Therfore, the functionally unnecessary fixing (slipping-off prevention) of the trunnion 22 and the roller assembly (32', 34) is left unpracticed in the present circumstance.

There may be thought of cases where the slipping-off prevention, which is functionally unnecessary, is required by the user from the standpoint of handling. Particularly, when the drive shaft removed from a vehicle, exceeding the permissible slide range, the rollers may come off. conventionally, as a means for preventing such roller coming-off, for example, a slipping-off preventive circlip is installed at the cup inlet portion of the outer joint member to control the slide or a slipping-off preventive circlip or snap ring is installed at the front end of the trunnion. Each such attempt has problems to be solved. That is, in the former case, there are problems including not only an increase in the number of parts due to the use of circlips but also an increase in weight due to the increased cup length of the outer joint member, while in the latter case, there are problems including an increase in the number of parts due to the use of circlips and snap rings, the increase in the number of parts leading to an increase in costs.

SUMMARY OF THE INVENTION

An object of the invention is to prevent the coming-off of the roller assembly without incurring an increase in costs due to the increased number of parts or an increase in weight due to the increased cup length of the outer joint member.

According to an embodiment of the present invention, a constant velocity joint comprises an outer joint member formed with three axial track grooves in the inner periphery and having axial roller guide surfaces on opposite sides of each track groove, a tripod member having three radially projecting trunnions, a roller assembly mounted on each trunnion of the tripod member, the roller assembly being tiltable with respect to the trunnion and having a roller guided along the roller guide surface in a direction parallel with the axis of the outer joint member, the joint being characterized in that a means for preventing the roller assembly from coming off is installed in the vicinity of the front end of the trunnion. Specifically, this means may take the form of projections. By making the relation between the circumscribed circle diameter af1 of the projections and the inner diameter ΦDs1 of the ring such that af1>ΦDs1, even if the roller assembly tries to move in the axial direction to come off the trunnion, the ring interferes with the projections, thereby preventing the roller assembly from coming off. It is desirable that the radial projecting amount (af1−ΦDs1) of the projections be set at about 0.05–0.1 mm. This is because if (af1−ΦDs1)<0.05 mm, the coming-off preventing function cannot be developed, while if (af1−ΦDs1)>0.1 mm, the amount of interference will be large, so that incorporating operation becomes difficult. Further, the lengthwise dimension h of the projections is preferably 0.1–0.5 mm. This is because if h<0.1 mm, the coming-off preventing function cannot be developed, while if h>0.5 mm, the amount of interference will be large, so that the incorporating operation becomes difficult.

The roller assembly may comprise the roller and a ring fitted on the trunnion for rotatably supporting the roller. In this case, the projections interfere with the inner diameter of the ring. The ring and roller may be fitted together so that they are relatively rotatable and that they are slide-contactable on their cylindrical surfaces, or rolling elements, such as needle rollers, may be interposed therebetween. At any rate, the ring and the roller are unitized so that they are inseparable as by washers.

The outer peripheral surface of the trunnion may be such that it is straight as seen in a longitudinal sectional view thereof and in a cross sectional view thereof it contacts the inner peripheral surface of the ring in a direction orthogonal to the axis of the joint, and defines a clearance between it and the inner peripheral surface of the ring in the direction of the axis of the joint. Such arrangement allows the roller assembly to oscillate with respect to the trunnion. As for the cross sectional shape of the trunnion, the shape is such that the trunnion contacts the inner peripheral surface of the ring in a direction orthogonal to the axis of the joint and defines a clearance between itself and the inner peripheral surface of the ring in the axial direction of the joint: in other words, the surfaces opposed to each other axially of the tripod member are retracted in the mutual direction, that is, toward the minor diameter sides, away from the imaginary cylindrical surface. A concrete example thereof is an ellipse. However, it is not limited literally to an ellipse, and it is to be understood that generally, it includes what are termed ovals.

Making the cross sectional shape of the trunnion in the shape described above allows the trunnion to tilt with respect to the outer joint member when the joint takes an operating angle, without changing the attitude of the roller assembly. Furthermore, since an osculating ellipse, or an elliptical area of contact, between the outer peripheral surface of the trunnion and the ring approaches a dot from oblongness, the friction moment tending to tilt the roller assembly reduces. Therefore, the attitude of the roller assembly is stabilized all the time, and the roller is held parallel with the roller guide surfaces, so that it rolls smoothly. This contributes to a reduction in slide resistance and hence in induced thrust. Further, there is another merit that the increased section modulus of the root of the trunnion increases the bending strength of the trunnion.

In addition, the roller assembly, which is interposed between the trunnion and the outer joint member, performs the function of transmission of torque. In this kind of constant velocity joint, the direction of transmission of torque is always orthogonal to the axis of the joint; therefore, the transmission of torque is possible in that the trunnion and the ring contact each other in the direction of transmission of torque. And there is no trouble caused in torque transmission even if there is a clearance between them in the axial direction of the joint. In attaching the roller assembly to the trunnion, it is necessary for the roller assembly to ride over the projection, but this can be easily attained since the cross section of the trunnion is elliptic. By elastically deforming the ring by radially inwardly applying an external force P to the roller assembly, the relations af1<Dda and b1<Ddb hold.

As for the method of forming projections as means for preventing the coming-off of the roller assembly, it may be effected by selectively leaving a non-ground region in the outer peripheral surface of the trunnion, as shown in FIG. 8 or by crimping the front end by plastic working or by beating. As shown in FIG. 11, the projections may be formed by cutting (lathing or grinding). After the roller has been attached to the trunnion, the front end may be crimped by plastic working or beating.

BRIEF DESCRIPTION OF THE DRAWINGS

FIG. 3A is an end view, partly in section, of the constant velocity joint;

FIG. 3B is a sectional view of a trunnion and a roller assembly, taken normal to the trunnion;

FIG. 3C is a longitudinal sectional view of the constant velocity joint, showing the joint taking an operating angle;

DESCRIPTION OF THE PREFERRED EMBODIMENTS

Figure 1A:
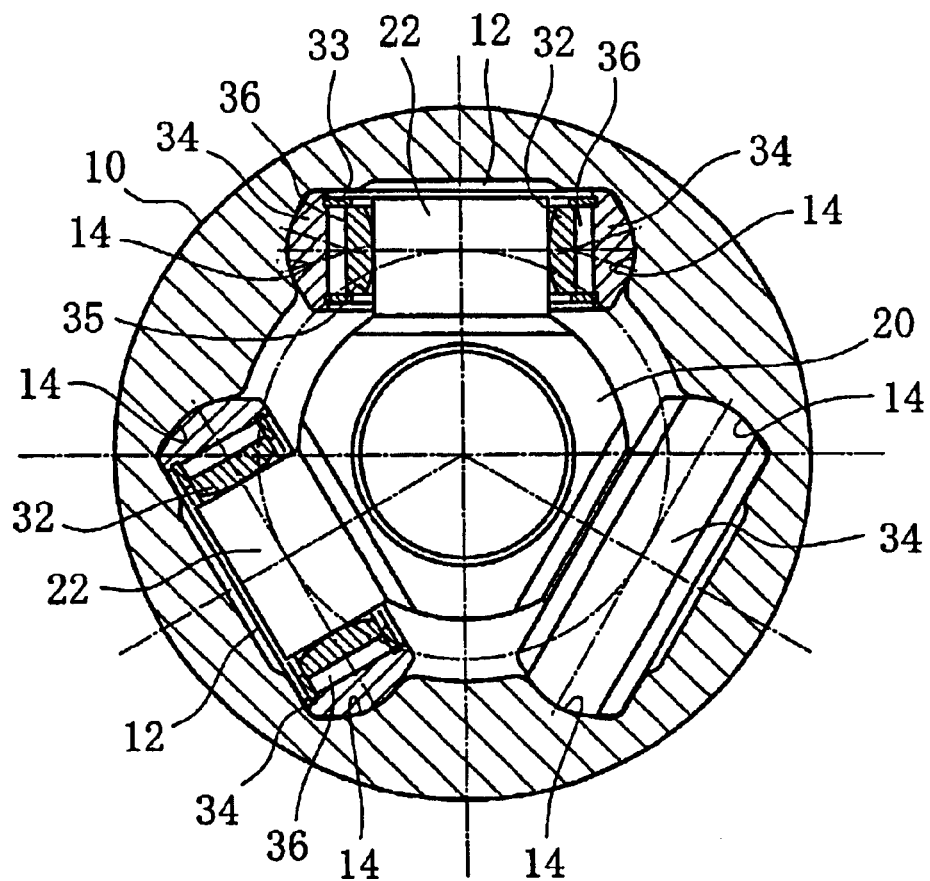
FIG. 1A is a cross sectional view of a constant velocity joint.
Figure 1B:
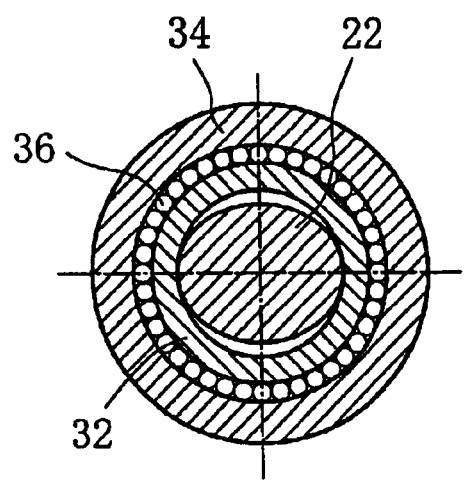
FIG. 1B is a sectional view of a trunnion and a roller assembly, taken normal to the trunnion.
Figure 1C:
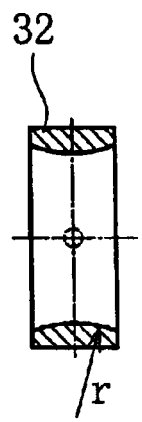
FIG. 1C is a sectional view of a ring.
Figure 2B:
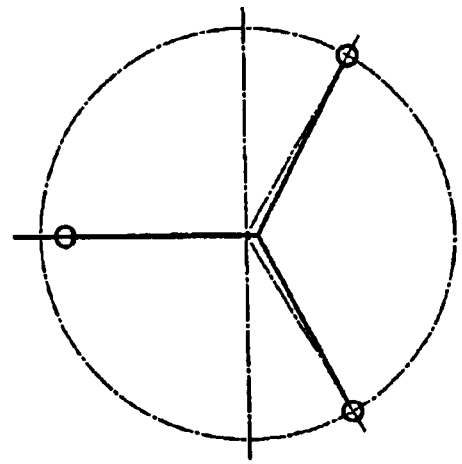
FIG. 2B is a schematic side view of a tripod member in FIG. 2A.
Figure 2A:
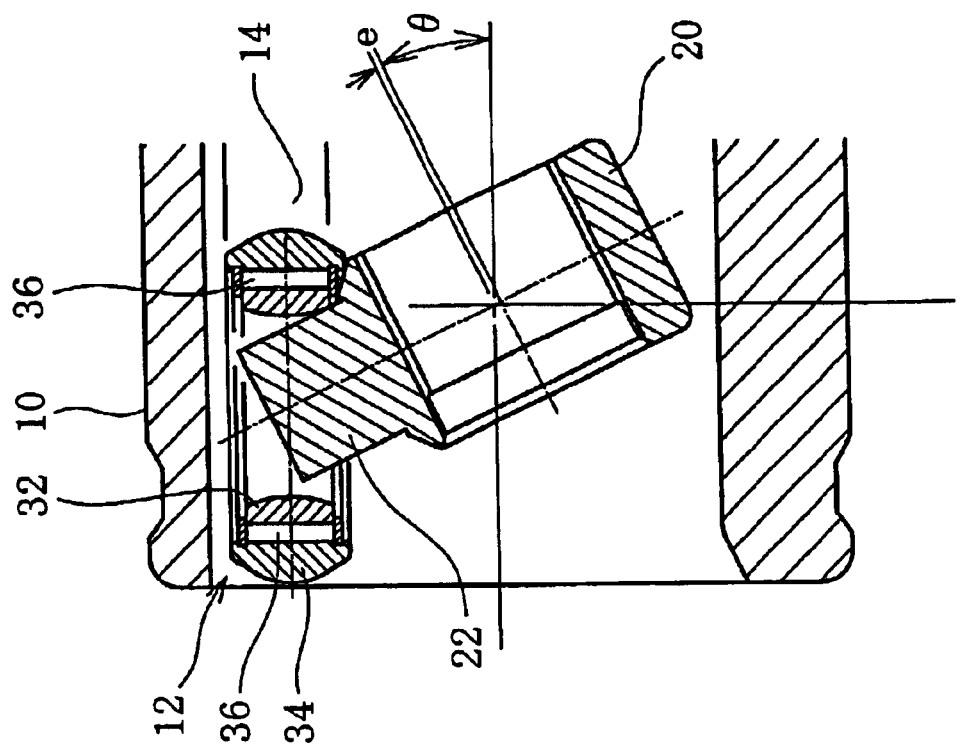
FIG. 2A is a longitudinal sectional view of the constant velocity joint of FIG. 1, showing the joint taking an operating angle.

First, the embodiment shown in FIGS. 1A to 2B will be described. FIG. 1A is a cross sectional view of a joint; FIG. 1B is a sectional view, taken normal to a trunnion; and FIG. 2A is a longitudinal sectional view of the joint, showing the joint taking an operating angle θ. As shown in FIGS. 1A to 1C, a constant velocity joint comprises an outer joint member 10 and a tripod member 20. One of the two shafts to be connected is connected to the outer joint member 10 and the other shaft is connected to the tripod member 20.

The outer joint member 10 has three axially extending track grooves 12 in the inner peripheral surface. The circumferentially opposed side walls of the track grooves 12 are formed with roller guide surfaces 14. The tripod member 20 has three radially projecting trunnions 22, each trunnion 22 having a roller 34 attached thereto, the roller 34 being received in the track groove 12 of the outer joint member 10. The outer peripheral surface of the roller 34 is a convex surface conforming to the roller guide surfaces 14.

The cross sectional shape of the roller guide surface 14 is the shape of Gothic arch, whereby the roller 34 and the roller guide surfaces 14 make angular contact. In FIG. 1A, the line of action of two contacting positions is shown in alternate long and short dash lines in FIG. 1A. Even if the cross sectional shape of the roller guide surfaces 14 is a taper shape with respect to the spherical roller outer peripheral surface, the angular contact between the two is realized. Thus, employing an arrangement in which the roller 34 and the roller guide surfaces 14 make angular contact stabilizes the attitude since the roller is made to hardly oscillate. In addition, when angular contact is not employed, for example, the roller guide surface 14 may be constructed by a portion of a cylindrical surface parallel with the axis of the outer joint member 10 and the cross sectional shape thereof may be the shape of an arc corresponding to the generatrix of the roller 34.

A ring 32 is fitted on the outer peripheral surface of the trunnion 22. The ring 32 and roller 34 are unitized through a plurality of needle rollers 36, constituting a relatively rotatable roller assembly. That is, with the cylindrical outer peripheral surface of the ring 32 serving as an inner track surface and with the cylindrical inner peripheral surface of the roller 34 serving as an outer track surface, the needle rollers 36 are rollably interposed between these inner and outer track surfaces. As shown in FIG. 1B, the needle rollers 36 are incorporated in the so-called all-roller state as in a full type roller bearing, without cage, so that as many rollers as possible are incorporated. What are denoted by the reference characters 33 and 35 are a pair of washers mounted in annular grooves formed in the inner peripheral surface of the roller 34 in order to prevent the needle rollers 36 from slipping off. These washers 33 and 35 have a cut in one circumferential place to allow them to be mounted in the annular grooves in the inner peripheral surface of the roller 34 in an elastically diametrically contracted state. Further, the presence of the washers 33 and 35 inseparably unitizes the ring 32 and roller 34.

The outer peripheral surface of the trunnion 22, when seen in a longitudinal sectional view (FIG. 2A), is straight, parallel with the axis of the trunnion 22, and, when seen in a cross sectional view (FIG. 1B), is elliptic, with the major axis extending orthogonal to the axis of the joint. The cross sectional shape of the trunnion is approximately elliptic with the thickness as seen axially of the tripod member 20 being reduced. In other words, the cross sectional shape of the trunnion is such that the surfaces opposed to each other axially of the tripod member are retracted in the mutual direction, that is, toward the minor diameter sides, away from the imaginary cylindrical surface.

The inner peripheral surface of the ring 32 has an arcuate convex surface. That is, the generatrix of the inner peripheral surface is a convex arc of radius r (FIG. 1C). This, coupled with the facts that the cross sectional shape of the trunnion 22 is approximately elliptic, as described above and that a predetermined clearance is defined between the trunnion 22 and the ring 32, results in the ring 32 being not only movable axially of the trunnion 22 but also oscillating-slidable with respect to the trunnion 22. Further, since the ring 32 and the roller 34 are relatively rotatably unitized through the needle rollers 36, as described above, the ring 32 and roller 34, as a unit, are in a tiltable relation with respect to the trunnion 22. The term "tiltable" means that the axes of the ring 32 and roller 34 are able to tilt with respect to the axis of the trunnion 22 in a plane including the axis of the trunnion 22 (see FIG. 2A).

Figure 6:
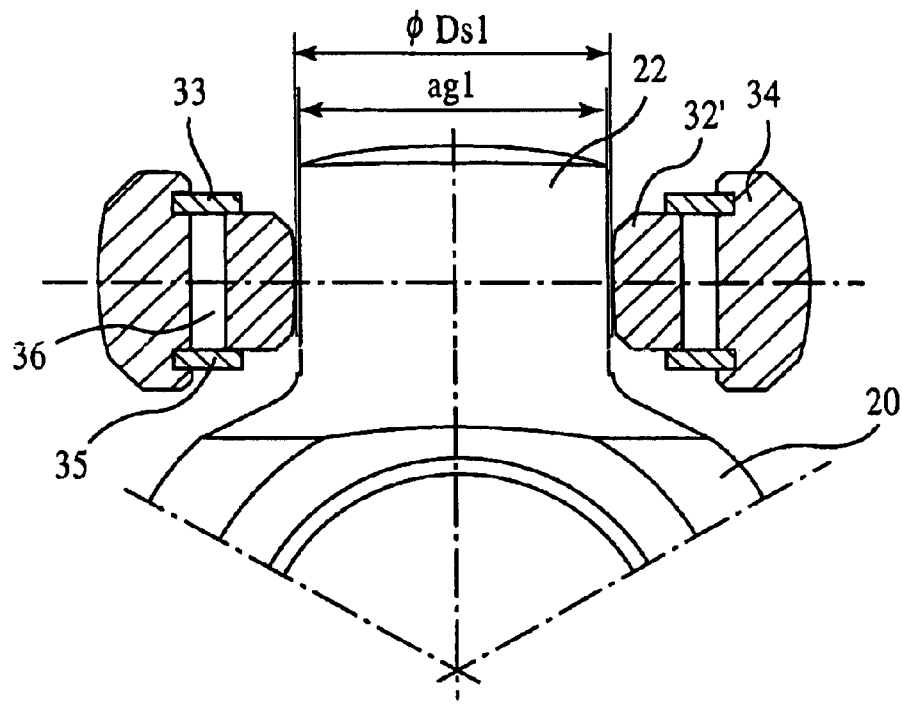
FIG. 6, which shows the prior art, is an enlarged sectional view of a trunnion and a roller assembly.
Figure 7:
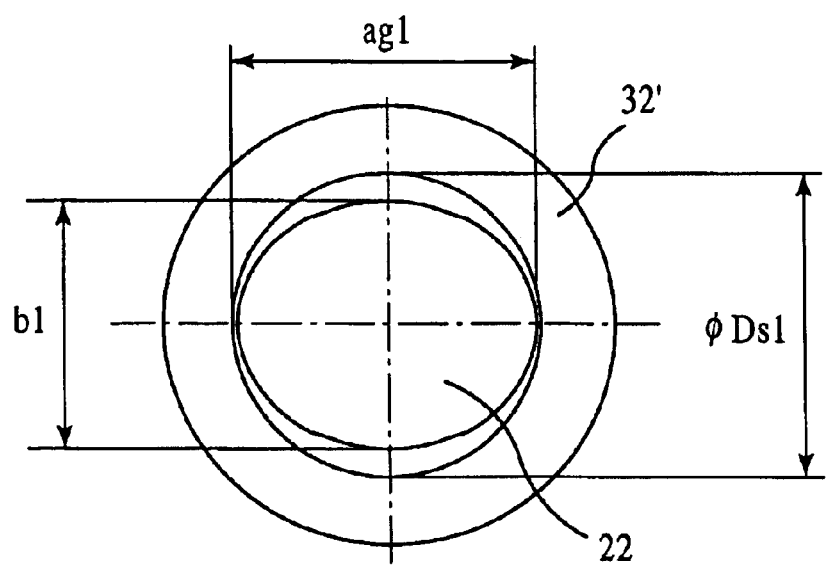
FIG. 7 is a plan view of a trunnion and a ring in FIG. 6.

In the embodiment shown in FIG. 1, the cross section of the trunnion 22 is approximately elliptic and the cross section of the inner peripheral surface of the ring 32 is cylindrical, so that as shown in broken line in FIG. 1C, their osculating ellipse is an almost dot and at the same time the area is small. Therefore, the force tending to tilt the roller assembly (32, 34) is greatly reduced as compared with the above-described prior art roller assembly of FIGS. 6–7, further improving the stability of the attitude of the roller 34. Further, the point of contact between the trunnion 22 and the inner peripheral surface of the ring 32 is always located at the widthwise center of the ring 32, so that the needle rollers 36 roll with stability.

Figure 4:
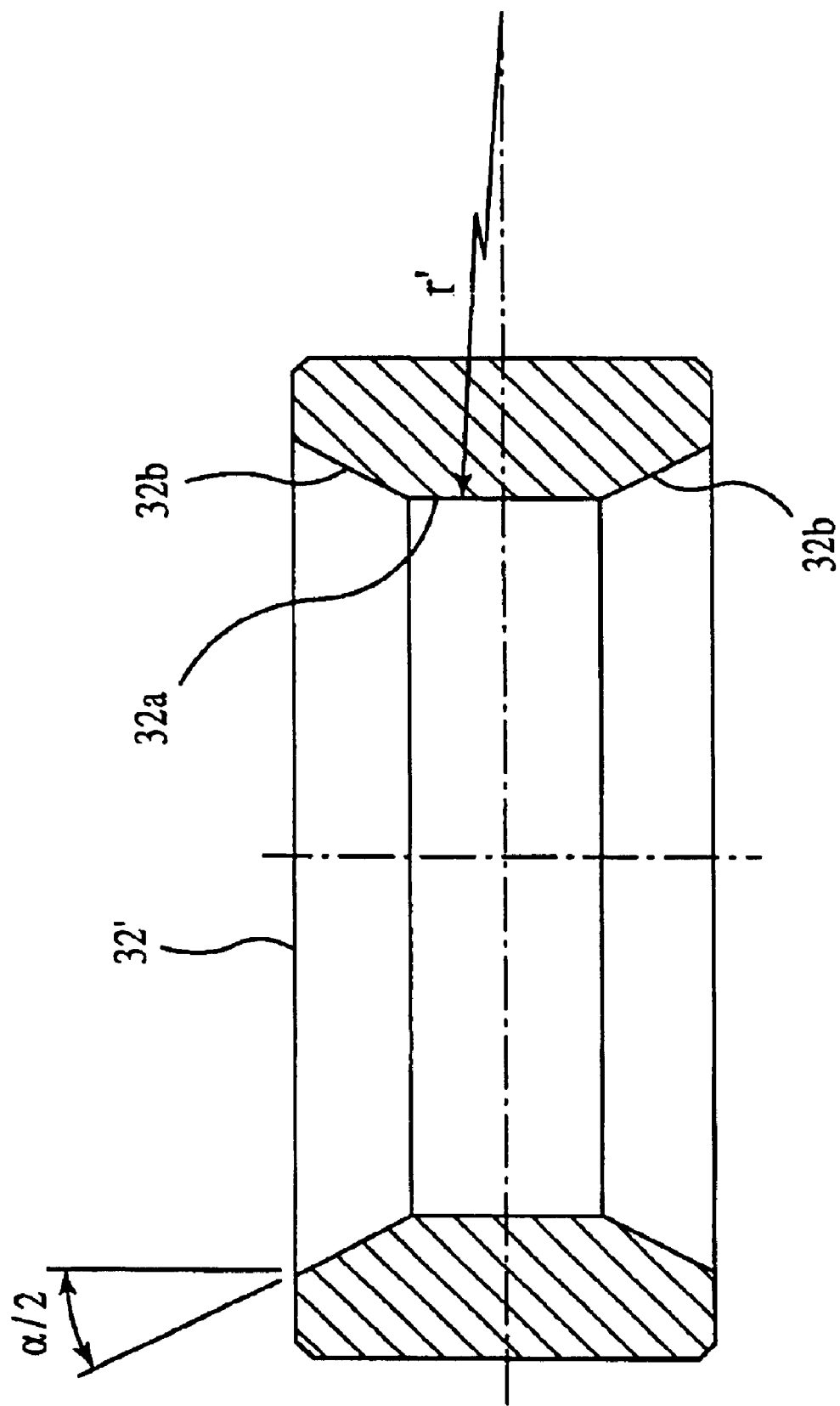
FIG. 4 is an enlarged sectional view of a ring in FIG. 3.

Next, an embodiment shown in FIGS. 3A to 4 will be described. In addition, in FIG. 3A, some of the parts, i.e., the ring 32', roller 34, washers 33 and 35 are shown in section. In the preceding embodiment, the generatrix of the inner peripheral surface of the ring 32 is formed of a single arc, whereas in this embodiment the inner peripheral surface of the ring 32' is formed of a combination of a central arc portion 32a and relief portions 32b on opposite sides, which is the only point in which this embodiment differs. The relief portions 32b are for the purpose of avoiding interference with the trunnion 22 when an operation angle θ is taken, as shown in FIG. 3C, and are defined by a straight line or curved line gradually diametrically expanding from the ends of the arc portion 32a toward the ends of the ring 32'. In this case, the relief portions 32b are shown by way of example as a portion of a conical surface having a conical angle α of 50°. The arc portion 32a has a large radius of curvature r' F, that is about 30 mm, for example, in order to allow the trunnion 22 to tilt through about 2–3° with respect to the ring 32'.

In the tripod type constant velocity joint, mechanically, each time the outer joint member 10 makes one revolution, the tripod member 20 wobbles three times with respect to the center of the outer joint member 10. At this time, the amount of eccentricity denoted by the reference character e (FIG. 2A) increases in proportion to the operating angle θ. And, if the three trunnions 22, though spaced 120° apart from each other, takes an operating angle θ, then, as shown in FIG. 2(B), considering the vertical trunnion 22 appearing in the upper area of the figure as a reference, the other two legs shafts 22 are slightly tilted from their axes associated with a zero operating angle shown in alternate long and short dash line. The tilt is about 2–3°, for example, when the operating angle θ is about 23°. Since this tilt is reasonably allowed by the curvature of the arc portion 32a of the inner peripheral surface of the ring 32', it is possible to prevent the surface pressure in the region of contact between the trunnion 22 and the ring 32' from becoming excessively high. In addition, FIG. 2B schematically shows the three trunnions 22 of the tripod member 20 as seen from the left-hand side surface of FIG. 2A, the solid line indicating the trunnions. Further, a clearance is formed between the major axis diameter 2a of the trunnion 22 and the inner diameter of the ring 32' to accommodate the tilt of the trunnion 22 due to the wobbling around the trunnion center peculiar to the tripod type constant velocity joint.

Figure 5:
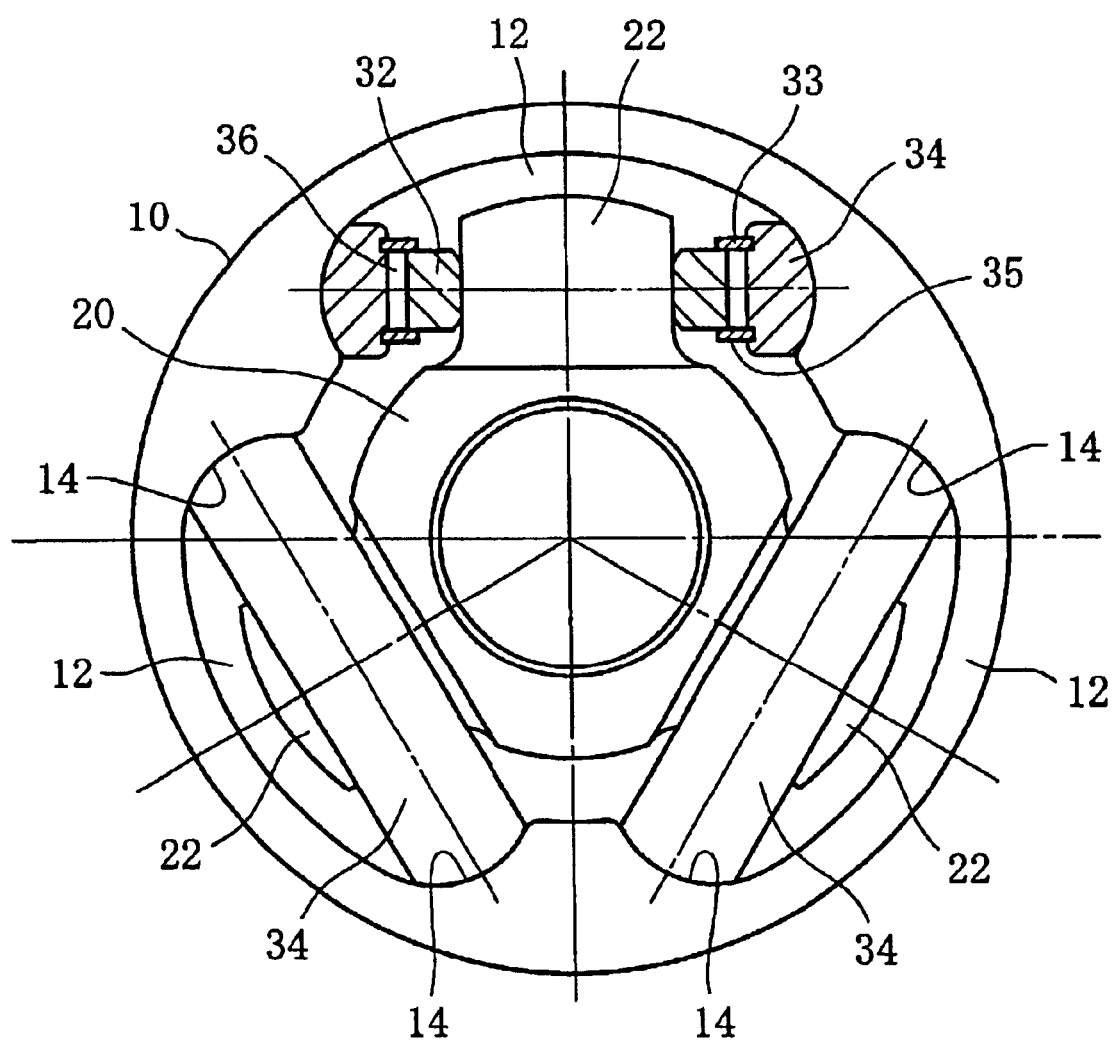
FIG. 5 is an end view, partly in section, of the constant velocity joint.

In the embodiment described above, as shown in FIGS. 1A and 3A, with the purpose of controlling the tilt of the roller 34, a flange opposed to the end surface of the roller 34 is formed in the innermost of the track groove 12, that is, on the major diameter side as seen in a cross sectional view of the outer joint member 10. However, in each of the embodiments described above, since the main factor for tilting of the roller 34 has been removed, it is not absolutely necessary to provide a flange in the track groove 12, and such flange may be omitted as shown in FIG. 5. As a result, even if the roller 34 temporality wobbles for one reason or another, there is no need whatsoever to worry about the roller touching the flange to produce sliding friction.

Figure 8:
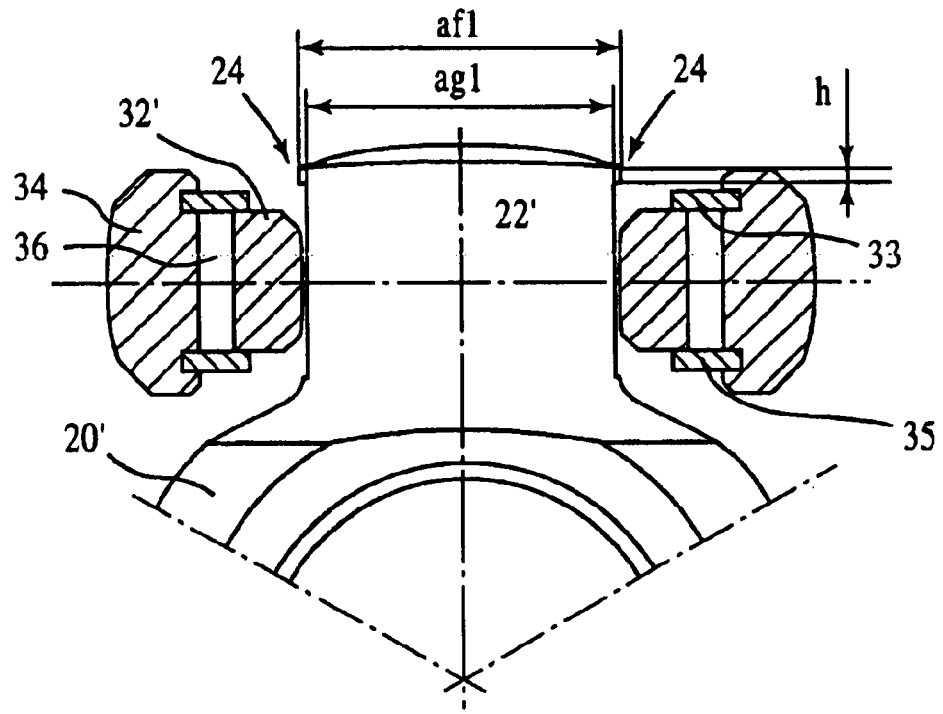
FIG. 8 is an enlarged sectional view of a trunnion and a roller assembly in a constant velocity joint in FIGS. 1, 3 and 5.
Figure 9:
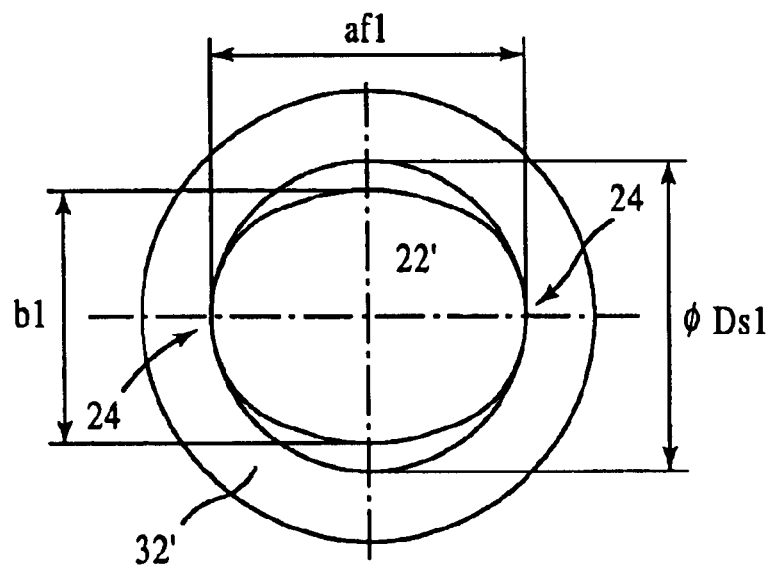
FIG. 9 is a plan view of a trunnion and a ring in FIG. 8.
Figure 10:
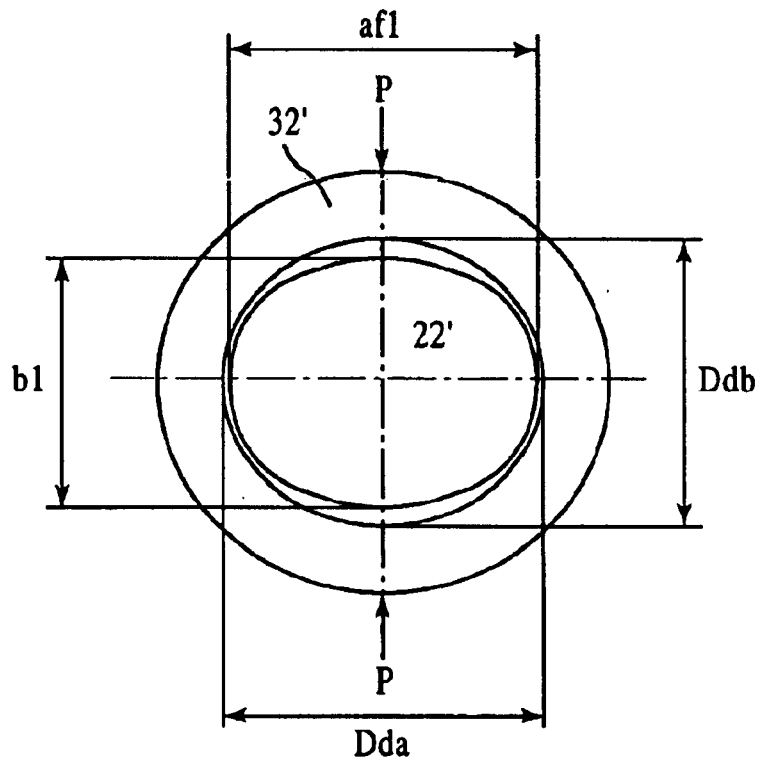
FIG. 10 is a plan view similar to FIG. 9, showing the ring elastically deformed.
Figure 11:
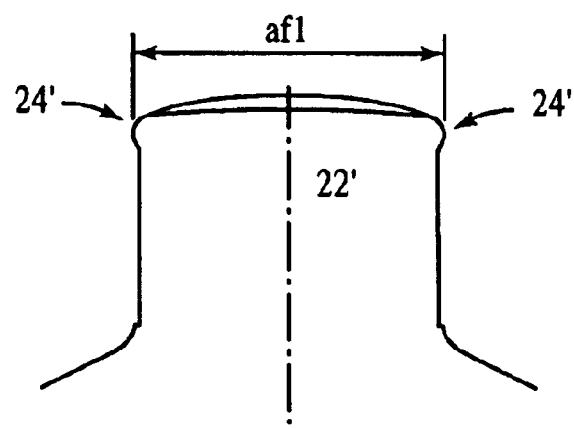
FIG. 11, which shows another embodiment of a projection, is a sectional view of a trunnion.

In each of the above embodiments, as shown enlarged in FIG. 8, projections 24 are formed in the vicinity of the front end of the trunnion 22' of the tripod member 20'. And, by making the relation between the circumscribed circle diameter af1 of the projections 24 and the inner diameter ΦDs1 of the ring 32 or 32' such that af1>ΦDs1, even if the roller assembly (32, 32', and 34) tries to move in the direction to come off the trunnion 22', the ring 32 or 32' interferes with the projections 24, thereby preventing the roller assembly (32, 32' and 34) from coming off. As a result, when the roller assembly (32, 32', and 34) is attached to the trunnion 22', it is necessary particularly for the ring 32 or 32' to ride over the projection 24, which can be easily achieved since in each embodiment the cross section of the trunnion 22' is elliptic. That is, as shown in FIG. 10, by elastically deforming the ring 32 or 32' by radially inwardly applying an external force P to the roller assembly (32, 32', and 34), the relations af1<Dda and b1<Ddb hold, wherein b1 represent the minor axis of the trunnion 22', Dda represents the major axis of the ring 32 when elastically deformed, and Ddb represents the minor axis of the ring 32 when elastically deformed. It is desirable that the radial projecting amount (af1−ΦDs1) of the projections 24 be set at about 0.05–0.1 mm. Further, the lengthwise dimension h of the projections is preferably 0.1–0.5 mm. Among the means for forming the projections 24 are selectively leaving the unpolished portion of the outer peripheral surface of the trunnion 22', and crimping or beating the front end by plastic working. As shown in FIG. 11, the projections 24' may be formed by cutting (lathing or grinding).

As has so far been described, with the invention, it is possible to solve the intended problem of preventing the roller assembly from coming off by a simple arrangement that consists in installing projections in the vicinity of the front end of the trunnion, without incurring an increase in costs due to an increase in the number of parts or an increase in weight due to an increase in the cup length of the outer joint member.

What is claimed is:

1. A constant velocity joint comprising:
   an outer joint member formed with three axial track grooves in an inner periphery and having axial roller guide surfaces on opposite sides of each track groove;
   a tripod member having three radially projecting trunnions;
   a roller assembly mounted on each trunnion of said tripod member, said roller assembly being tiltable with respect to said trunnion and having a roller guided along said roller guide surface in a direction parallel with an axis of the outer joint member, wherein a means for preventing said roller assembly from coming off is disposed in a vicinity of a front end of said trunnion and includes at least one integrally formed projecting portion of said trunnion.

2. A constant velocity joint as set forth in claim 1, wherein said roller assembly comprises said roller and a ring fitted on said trunnion for rotatably supporting said roller.

3. A constant velocity joint as set forth in claim 2, wherein the outer peripheral surface of said trunnion is straight as seen in a longitudinal sectional view thereof and in a cross sectional view thereof it contacts the inner peripheral surface of said ring in a direction orthogonal to the axis of the joint, and defines a clearance between it and the inner peripheral surface of said ring in the direction of the axis of the joint.

4. A constant velocity joint as set forth in claim 1, wherein the means for preventing said roller assembly from coming-off includes projections formed on said trunnion by plastic working.

5. A constant velocity joint as set forth in claim 1, wherein the means for preventing said roller assembly from coming-off includes projections formed on said trunnion by cutting.

* * * * *